US010587190B1

(12) United States Patent
Matej et al.

(10) Patent No.: US 10,587,190 B1
(45) Date of Patent: Mar. 10, 2020

(54) CHARGE PUMP WITH INDIVIDUALIZED SWITCHING CONTROL

(71) Applicant: SEMICONDUCTOR COMPONENTS INDUSTRIES, LLC, Phoenix, AZ (US)

(72) Inventors: Jan Matej, Roznov pod Radhostem (CZ); Pavel Londak, Hutisko-Solanec (CZ); Petr Rozsypal, Hutisko-Solanec (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 16/183,844

(22) Filed: Nov. 8, 2018

(51) Int. Cl.
*G05F 3/02* (2006.01)
*H02M 3/07* (2006.01)

(52) U.S. Cl.
CPC ...... *H02M 3/073* (2013.01); *H02M 2003/075* (2013.01); *H02M 2003/077* (2013.01)

(58) Field of Classification Search
CPC ........... H02M 3/073; H02M 2003/075; H02M 2003/077
USPC ....................................................... 327/536
See application file for complete search history.

(56) References Cited

U.S. PATENT DOCUMENTS

| 7,602,233 | B2* | 10/2009 | Pietri | H02M 3/073 327/536 |
| 7,652,522 | B2* | 1/2010 | Racape | G11C 5/145 327/536 |
| 7,855,591 | B2* | 12/2010 | Racape | H02M 3/073 327/536 |
| 9,281,743 | B1* | 3/2016 | Oner | H02M 3/073 |
| 9,369,115 | B2* | 6/2016 | Kalluru | H03K 5/023 |
| 2005/0212586 | A1* | 9/2005 | Daga | H02M 3/073 327/536 |
| 2008/0031023 | A1* | 2/2008 | Kitagawa | H02M 3/07 363/59 |
| 2012/0049936 | A1* | 3/2012 | Adkins | H02M 3/07 327/536 |
| 2013/0015919 | A1* | 1/2013 | Kropfitsch | H03F 1/38 330/260 |
| 2013/0257522 | A1* | 10/2013 | Daigle | H02M 3/07 327/536 |

(Continued)

OTHER PUBLICATIONS

Zhicong Luo et al., "Regulated Charge Pump with New Clocking Scheme for Smoothing the Charging Current in Low Voltage CMOS Process," IEEE Transactions on Circuits and Systems—I: Regular Papers, vol. 64, No. 3, Mar. 2017.

*Primary Examiner* — Ryan Jager
(74) *Attorney, Agent, or Firm* — Brake Hughes Bellermann LLP

(57) ABSTRACT

Circuits, methods, and system for DC voltage conversion are disclosed. A charge pump circuit is described that includes input switches and output switches that are individually controlled by different clock signals to alternatively couple energy storage capacitors to an input and to an output. The individualized switching control allows for the use of clock signals with no overlapping transitions to improve conversion efficiency. Additionally, the input switches are controlled by clock signals that are level shifted relative to the input voltage. The level shifted switching control also improves efficiency and allows for a range in input voltages to be accommodated for DC voltage conversion.

18 Claims, 9 Drawing Sheets

(56) References Cited

U.S. PATENT DOCUMENTS

2013/0293284 A1* 11/2013 Drost ................... H02M 3/073
327/536
2014/0307493 A1* 10/2014 Chevalier ............... H02M 3/07
363/60

* cited by examiner

US 10,587,190 B1

CHARGE PUMP WITH INDIVIDUALIZED SWITCHING CONTROL

FIELD OF THE DISCLOSURE

The present disclosure relates to voltage converters and, more specifically, to a charge pump circuit with individualized switching control.

BACKGROUND

Charge pumps may be generally used to boost (e.g., double) a direct current (DC) voltage at an input to a higher DC voltage at an output. A charge pump may accomplish this voltage boost by alternatively configuring a capacitor between an input and a low clock signal for receiving energy and configuring the capacitor between a high clock signal and an output for providing energy. The charge pump may include two symmetric portions that operate in complementary fashion. In particular, while a first portion is receiving energy (i.e., charging) a second portion is providing energy (i.e., discharging) and vice versa. In this way, the combined result at the output is a DC voltage that is higher than the input, and any noise from switching (e.g., spikes) may be suppressed by a capacitor at the output.

The switching in charge pumps may be accomplished using diodes, but as voltages decrease these devices have increasingly poor power conversion efficiency (i.e., efficiency) because the voltage drops across the diodes become increasingly comparable to the input voltage of the charge pump. Additionally, in some charge pump circuit topologies, the efficiency of the charge pump suffers from current crosstalk during switching. Accordingly, new charge pump circuits are needed to provide efficient operation, especially in a low voltage regime.

SUMMARY

Accordingly, in one aspect, the present disclosure describes a charge pump circuit. The charge pump circuit includes two symmetric portions: a first portion and a second portion. The first portion includes a first energy-storage capacitor. The first portion also includes a first output transistor that is controlled by a pump-out clock to couple and decouple the first energy-storage capacitor to an output of the charge pump. The first portion also includes a first input transistor that is configurable to couple and decouple the first energy storage capacitor to an input of the charge pump. The first portion also includes a first conditioning circuit that is coupled between a pump-in clock and a gate of the first input transistor. The first conditioning circuit level shifts the pump-in clock to voltages relative to an input voltage of the charge pump circuit. The second portion of the charge pump circuit is symmetric (i.e., includes the same elements arranged in the same way as the first section) and the operation is complementary (i.e., based on inverse clock signals).

In one possible embodiment, the input and output transistors of each portion are each driven individually by a different clock signal, and the different clock signals are configured so that no clock transitions overlap in time.

In another aspect, the disclosure describes a system for converting a DC voltage. The system includes a first charge pump circuit that includes two symmetric portions (i.e., a first portion and a second portion). Each symmetric portion includes an energy storage capacitor that is coupled between an input switch and an output switch. The input switch and the output switch are individually controlled by different clock signals to alternatively couple the energy storage capacitor to an input and to an output. Each symmetric portion further includes a conditioning circuit. The conditioning circuit, for each symmetric portion, level shifts the clock signal controlling the input switch to voltages that are relative to a voltage at the input.

In at least one possible embodiment, the system includes at least one additional charge pump circuit connected in series with the first charge pump circuit to convert the DC voltage at the input of the first charge pump circuit to a higher voltage. For example, if a first and a second charge pump circuit each double an input voltage then a system that includes the first and second charge pump circuits connected in series provides output DC voltage that is four times the input DC voltage.

In another aspect, the present disclosure describes a method for controlling the switching in a DC-DC converter. The method includes receiving a pump-out clock signal and controlling an output switch to couple an energy storage capacitor to an output according to the pump-out clock signal. The method also includes receiving a pump-in clock signal. The pump-in clock signal is level shifted to voltages relative to an input voltage (i.e., the voltage at the input of the DC-DC converter) and used to control an input switch to couple the energy storage capacitor to the input.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure is related to a cross-coupled switched capacitor charge pump circuit in which the switching devices are controlled individually. The individualized switch control allows for non-overlapping clock signals to reduce crosstalk. The individualized switch control is facilitated by a conditioning circuit that generates (e.g., creates) a clock signal at voltages relative to the input voltage. The conditioning circuit can increase switching strength to reduce cross talk and can accommodate a range of input voltages for conversion.

Figure 1A:
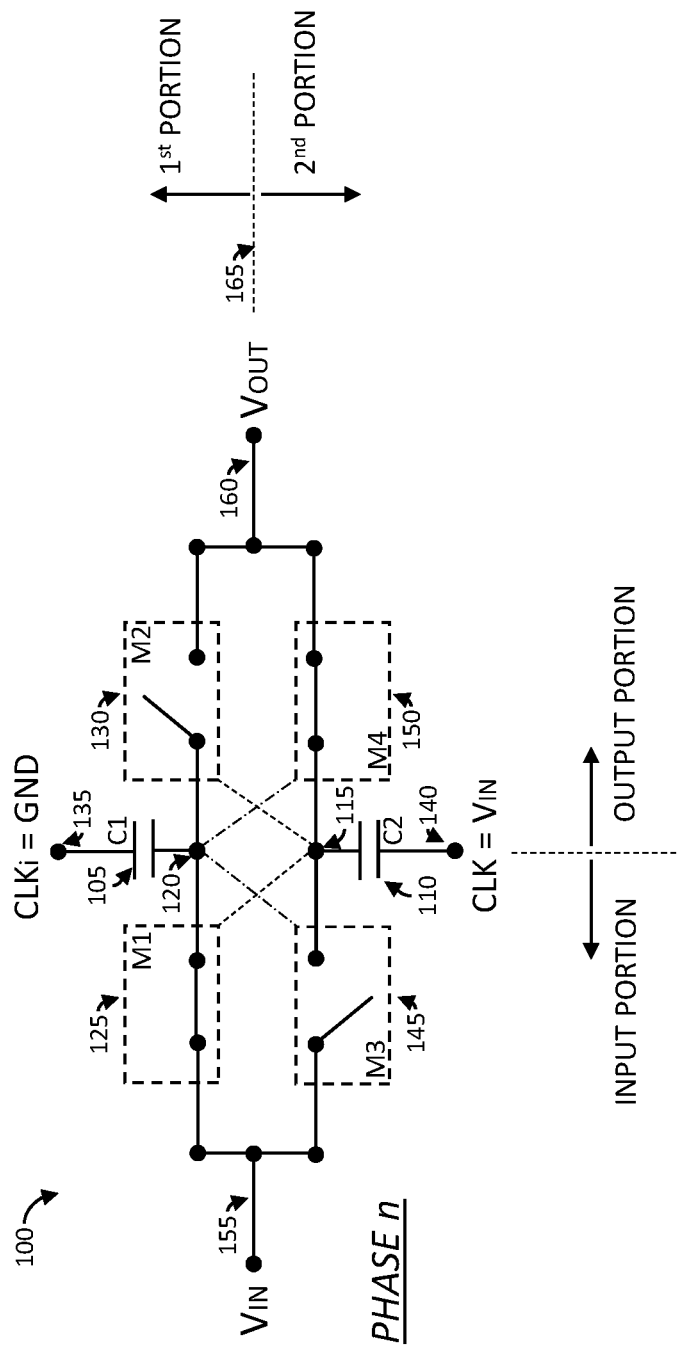
FIG. 1A schematically depicts a cross-coupled switched-capacitor charge pump at a first phase.
Figure 1B:
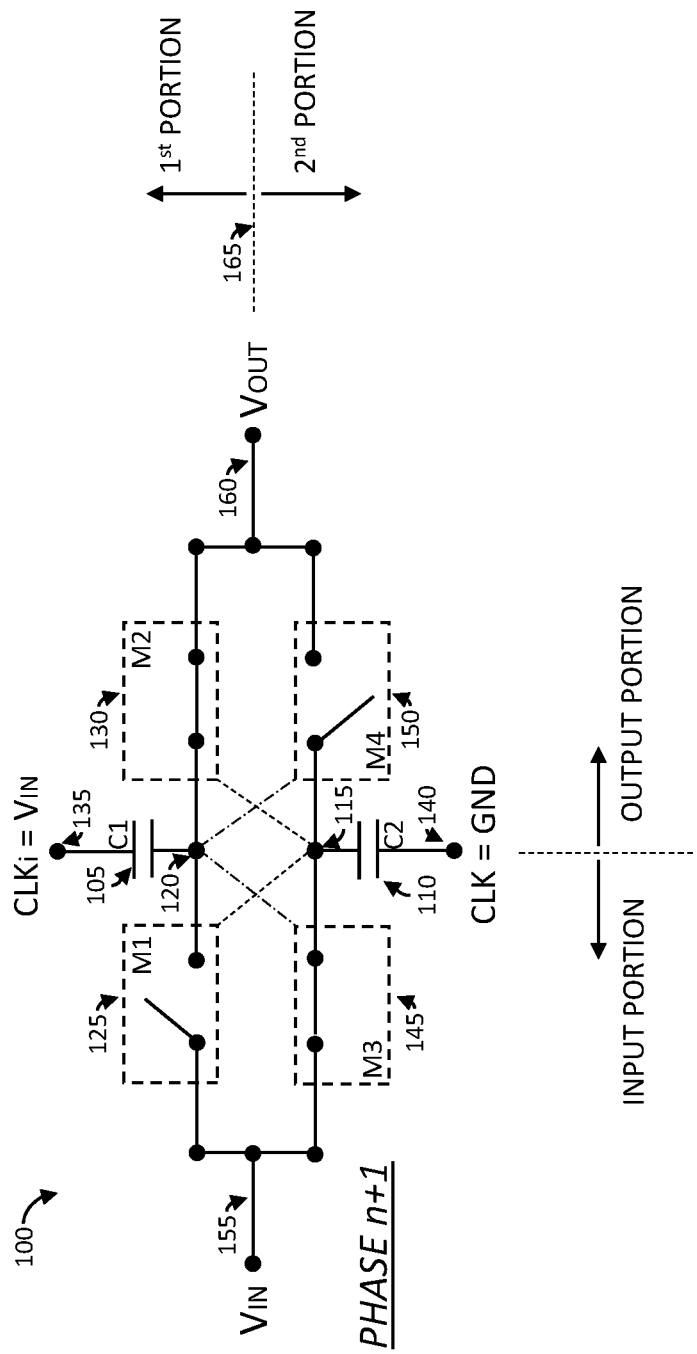
FIG. 1B schematically depicts a cross-coupled switched-capacitor charge pump at a second phase.

To understand the operation of the disclosed charge pump circuit, a basic cross-coupled switched-capacitor circuit (i.e., circuit) is shown in FIG. 1A and FIG. 1B. The circuit 100 converts an input DC voltage at an input 155 ($V_{IN}$) to an output DC voltage at an output 160 ($V_{OUT}$). The output voltage, $V_{OUT}$, is higher than the input voltage, $V_{IN}$ (e.g., $V_{OUT}=2V_{IN}$). As will be described, the circuit 100 includes two symmetric portions (i.e., a first portion and a second portion) that operate in a complementary fashion. Additionally, each portion may be considered as having an input portion and an output portion.

The circuit 100 receives a first clock signal (CLKi) at a first clock input 135 and a second clock signal (CLK) at a second clock input 140. The first clock signal is a phase shifted version of the second clock signal. Because the phase shift is generally 180 degrees, the first clock signal (CLKi) is regarded as the inverse (i.e., complement) of the second clock signal (CLK).

The circuit 100 includes four switching devices 125, 130, 145, 150. The switching devices are controllable by the first clock signal (CLKi) or the second clock signal (CLK). Based on the clock control, each switch may be in an ON state (i.e., conducting) or an OFF state (i.e., non-conducting). The switches 125, 130, 145, 150 may be embodied in various ways (e.g., mechanical, semiconductor, electron devices, etc.) but in some implementations the switches are semiconductor switches. Various types of semiconductor switches may be utilized in the circuit. These types include (but are not limited to) bipolar junction transistor (BJT), metal oxide semiconductor field effect transistor (MOSFET), and junction field effect transistor (JFET).

The present disclosure describes circuits that utilize MOSFET technology for switching. The MOSFETs may have a p-channel or an n-channel and may operate in enhancement mode or in depletion mode. Further, the MOSFETs may be made in complementary pairs comprising complementary metal oxide semiconductor (CMOS) logic. While the present disclosure refers n-channel MOSFET (NMOS) and p-channel MOSFET (PMOS) transistors operating in enhancement mode, the present disclosure recognizes that variations may exists and is, therefore, not limited to any particular type or construction as long as the operation is similar to those disclosed.

As mentioned, the circuit 100 may be considered as having two symmetrical portions (i.e., sides) on either side of a line of symmetry 165. A first portion (i.e., $1^{st}$ portion) of the two symmetrical portions includes an input switch (M1) 125, an output switch (M2) 130, and an energy storage capacitor (C1) 105. A second portion (i.e., $2^{nd}$ portion) of the two symmetrical portions includes an input switch (M3) 145, an output switch (M4) 150, and an energy storage capacitor (C2) 110.

FIG. 1A illustrates the switching state of the charge pump circuit 100 when the clocks are in a first possible phase (e.g., PHASE n). In the first possible phase, the first clock signal (CLKi) at the first clock input 135 is equal to a relatively low voltage (e.g., a ground voltage, GND) and the second clock signal (CLK) at the second clock input 140 is equal to a relatively high voltage (i.e., the input voltage, $V_{IN}$). The charge pump is cross coupled because the switches of the first portion (i.e., M1, M2) are controlled by the second clock signal (CLK) at a second node 115, while switches of the second portion (i.e., M3, M4) are controlled by the first clock signal (CLKi) at a first node 120. M1 and M2 respond in complementary fashion to the second clock signal (CLK) (i.e., one is turned ON while the other is turned OFF), and M3 and M4 respond in complementary fashion to the first clock signal (CLKi). The complementary states of the switches may be accomplished by using a first switch type (e.g., NMOS) for the input switches M1 125 and M3 145 and a second switch type (e.g., PMOS) for the output switches M2 130 and M4 150.

In the first phase (PHASE n), the second node 115 is at a relatively high voltage (e.g., $2V_{IN}$), which configures M1 125 (i.e., the input switch of the first portion) in an ON state and M2 130 (i.e., the output witch of the first portion) in an OFF state. The first node 120 is at a relatively low voltage (e.g., $V_{IN}$), which configures M3 145 (i.e., the input switch of the second portion) in an OFF state and M4 150 (i.e., the output switch of the second portion) in an ON state.

In the circuit 100, the first energy-storage (i.e., energy-transfer) capacitor, C1 105, is coupled between the first node 120 and the first clock input 135. The second energy storage (i.e., energy transfer) capacitor, C2 110, is coupled between the second node 115 and the second clock input 140. In the first phase (PHASE n), C1 105 is coupled to the input 155 by M1, decoupled from the output 160 by M2, and charged to a voltage, $V_{IN}$. C2 110 is coupled to the output 160 by M4 and decoupled from the input 155 by M3.

FIG. 1B illustrates the switching state of the charge pump circuit 100 when the clocks are in a second phase (i.e., PHASE n+1). In the second phase (PHASE n+1), the second node 115 is at a relatively low voltage (e.g., $V_{IN}$), which configures M1 125 in an OFF state and M2 130 in an ON state. The first node 120 is at a relatively high voltage (e.g., $2V_{IN}$), which configures M3 145 in an ON state and M4 150 in an OFF state.

In the second phase (PHASE n+1), C1 105 is decoupled from the input 155 by M1 125. C1 105 is coupled to the output 160 by M2 130 to provide energy stored in C1 during the previous phase state (PHASE n) to the output 160. C2 110 is decoupled from the output 160 by M4. C2 110 is coupled to the input 155 by M3 to recharge C2 (e.g., to $V_{IN}$). The recharge is possible because the charge (i.e., energy) stored in the capacitor C2 110 was coupled to the output 160 during the previous phase (PHASE n).

The switching continues as described so that during each phase one of C1 105 and C2 110 are coupled to the input for charging and one of C1 105 and C2 110 are coupled to the output to provide an output voltage that is higher than the input voltage (e.g., $V_{OUT}=2V_{IN}$). Because C1 105 and C2 110 typically have the same capacitance, the output voltage, $V_{OUT}$, is substantially a DC voltage but may have ripple noise (e.g., between phases) that can be removed by a filter (e.g., a capacitor that is larger than $C_1$ or $C_2$) placed at the output 160 (not shown).

Ideally, the switches M1, M2, M3, and M4 exist in either a completely OFF state (i.e., have infinite resistance) or a completely ON state (i.e., zero resistance) and change (i.e., transition) between ON/OFF states immediately. When embodied as semiconductor transistors, the switches M1, M2, M3, and M4 may be partially ON (or OFF) as they transition between states. This partially ON/OFF state can lead to unwanted coupling that causes crosstalk currents. Crosstalk currents reduce the overall efficiency of the charge pump circuit 100.

Figure 2:
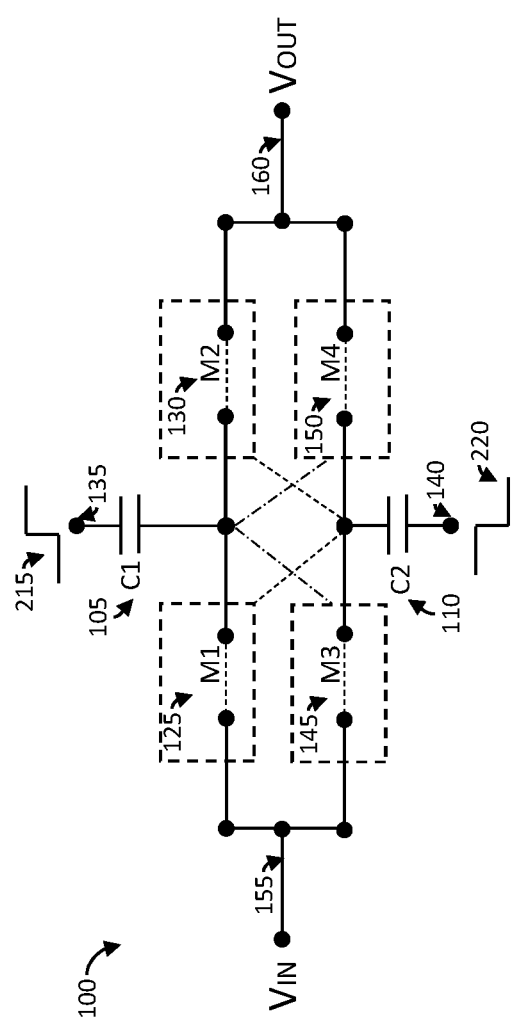
FIG. 2 schematically depicts a cross-coupled switched-capacitor charge pump in a crosstalk scenario.

A possible unwanted switching condition is illustrated in FIG. 2. The first clock signal 215 transitions from a relatively low level (e.g., GND) and a relatively high level ($V_{IN}$) while the second clock signal 220 transitions from a relatively high voltage level (e.g., $V_{IN}$) to a relatively low voltage level (e.g., GND). The transition between the states of switches may not be instantaneous leading to the condition shown in FIG. 2 in which switches M1 125, M2 130, M3 145, M4 150 are each in a partially conducting state as they transition either from ON to OFF or OFF to ON. In this state there are a variety of current cross talks, such as between the input 155 and the output 160 and between the first capacitor 105 and the second capacitor 110.

Current cross talk leads to inefficiency of the circuit 100. For example, in addition to coupling its charge to the output 160, C1 105 may couple a portion of its charge to C2 110 through M4 150 and M2 while they are both in a partially ON state. Additionally, a current from the output may flow back to the input 155 through M4 150 and M3 145 while they are both in a partially ON state. The effect of current cross talk on efficiency becomes more significant as the frequency of the clocks (i.e., the switching frequency) is increased because the overlapping portions of switching spans a larger portion of the overall phase.

The present disclosure describes circuits and methods that can increase the efficiency of a cross coupled charge pump circuit by controlling each switch individually with a particular clock signal. The individual control allows for customized clock signals to prevent overlapping clock transitions. The circuits and methods can also produce level-shifted clocks for switching the input switches. The level shifts of the clocks are each relative to the input and, therefore, the charge pump circuit can accommodate a range of voltages at the input.

Figure 3:
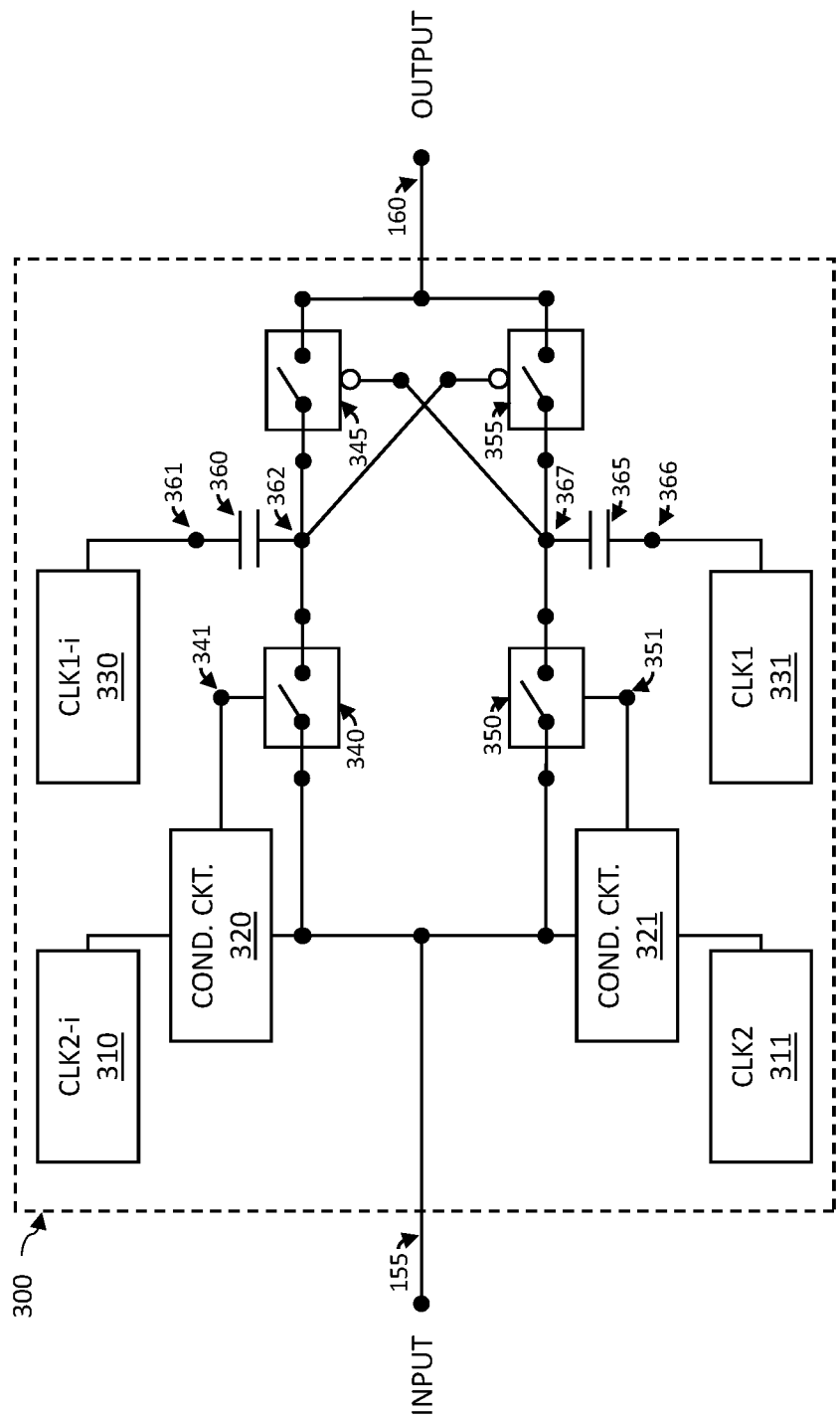
FIG. 3 is a block diagram of a system for converting a DC voltage according to an embodiment of the present disclosure.

FIG. 3 is a block diagram of a system 300 for converting a first DC voltage at an input 155 to second DC voltage at an output 160 (e.g., $V_{OUT}=2V_{IN}$). The system 300 includes a cross-coupled charge pump circuit that includes symmetric output portions driven by a first pair of complementary clocks (i.e., pump-out clocks—CLK1-$i$ and CLK1). A first output portion includes a first energy storage capacitor 360 that is coupled at a first terminal 361 to an inverse first clock (CLK1-$i$) 330 and coupled at a second terminal to a first node 362. The voltage at the first node 362 is coupled from the first output portion to drive a controlling terminal (e.g., gate) of a second output switching device 355 (i.e., a cross coupled configuration). A second output portion includes a second energy storage capacitor 365 that is coupled at a first terminal 366 to a first clock (CLK1) 331 and coupled at a second terminal to a second node 367. The voltage at the second node 367 is coupled from the second output portion to drive a controlling terminal (e.g., a gate) of a first output switching device 345.

The output switching devices 345, 355 may be PMOS transistors but the described circuit may utilize other types (e.g., NMOS) and other technologies (e.g., BJT, JFET, etc.). The inverse-first clock (CLK1_$i$) 330 and the first clock (CLK1) 331 are phase shifted by about (e.g., with ±5 degrees) 180 degrees so that the output switching devices 345, 355 alternatively couple/decouple capacitors 360, 365 to/from the output 160.

Figure 4:
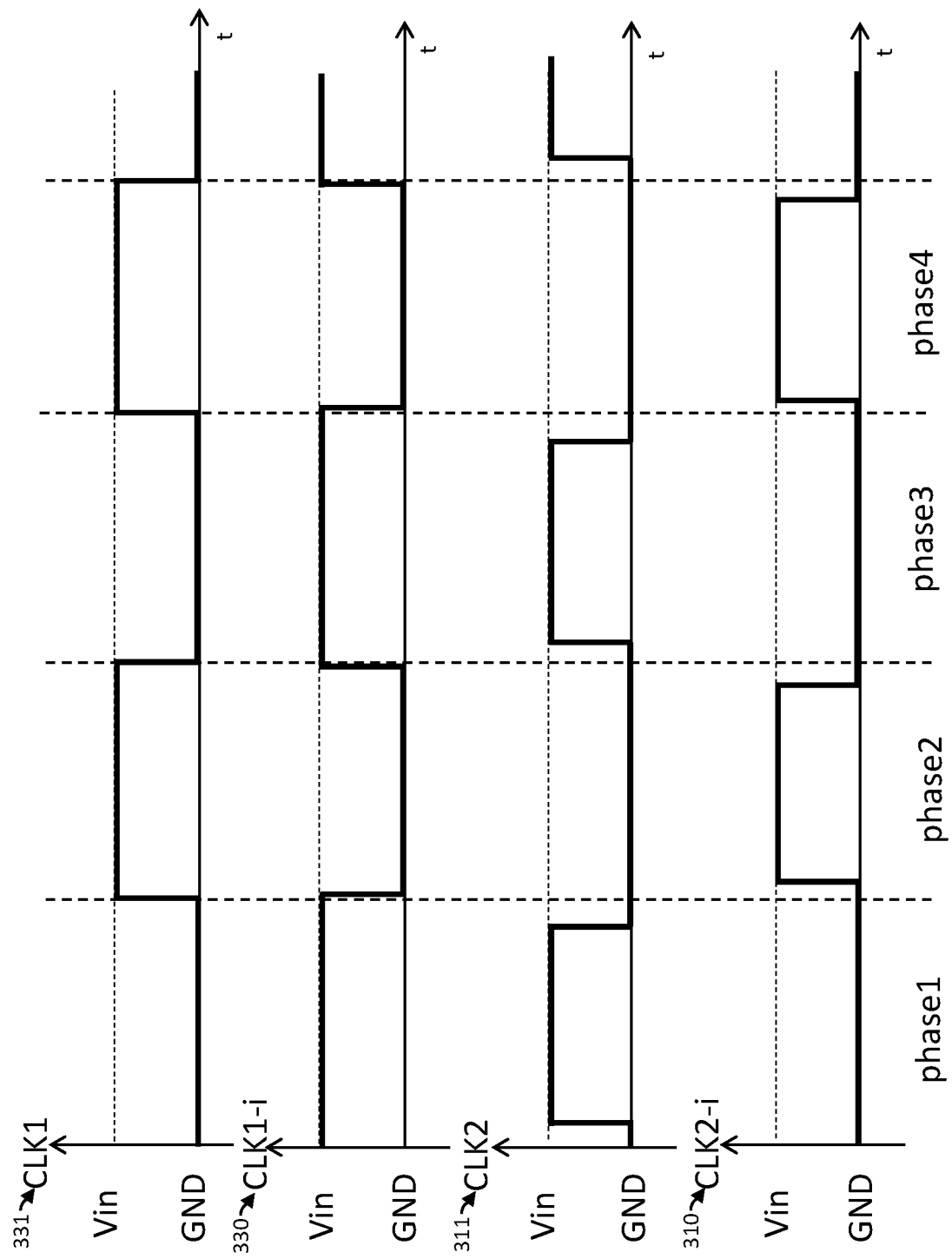
FIG. 4 is a timing diagram illustrating the relative timing of clock signals used in the system of FIG. 3 according to an embodiment of the present disclosure.

Example clock signals are shown in FIG. 4. The inverse first clock (CLK1-$i$) and the second clock (CLK1) are complementary. When CLK1 is at a relatively low voltage (e.g., GND) CLK1-$i$ is at a relatively high voltage ($V_{IN}$) and vice versa. The clocks alternate according to a clock frequency (i.e., switching frequency). The clocks may transition between phases at identical times, but in order to prevent cross talk (e.g., first capacitor 360 coupled to second capacitor 365) during a switch transition, the clocks signals can be configured so that the transitions of the inverse first clock signal and the transitions of the first clock signal do not overlap in time. The non-overlapping clock transitions may be accomplished slightly (e.g., <1 percent %) adjusting the duty cycle of one clock signal relative to another. For example, the inverse first clock (CLK1-$i$) transitions to a relatively low voltage (i.e., turns OFF) after the first clock signal (CLK) transitions to a relatively high voltage (i.e., turns ON), and CLK1-$i$ turns ON before CLK1 turns OFF. In this way, CLK1-$i$ may be described as having a different duty cycle than CLK1. The relative duty cycle difference between the clocks may be adjusted to ensure that the overlap of the ON states of the switches is minimized (e.g., decreased, reduced, made zero). This adjustment may correspond to maximizing the efficiency at which energy is coupled from the energy storage capacitors 360, 365 to the output 160 of the system 300.

Returning to FIG. 3, the cross coupled charge pump circuit further includes symmetric input portions that are driven by a second pair of complementary clocks (i.e., pump-in clocks—CLK2-$i$ and CLK2). A first input portion includes a first input switching device 340 that can be configured (ON/OFF) by a signal at a controlling terminal (e.g., a gate) 341 to couple/decouple the first energy storage capacitor 360, to/from the input 155 based on an inverse second clock (CLK2-$i$) 310. A second input portion includes a second input switching device 350 that can be configured (ON/OFF) by a signal at a controlling terminal (e.g., a gate) 351 to couple/decouple the second energy storage capacitor 365, to/from the input 155 based on a second clock (CLK2) 311.

As shown in FIG. 4, the inverse second clock (CLK2_$i$) 310 and the second clock (CLK2) 311 are phase shifted by about (e.g., with ±5 degrees) 180 degrees (i.e., are complementary). When CLK2 311 is at a relatively high voltage (e.g., $V_{IN}$), CLK2-$i$ is at a relatively low voltage (e.g., GND) and vice versa. The clocks alternate according to a clock frequency (i.e., switching frequency). The clocks may transition between phases at identical times, but in order to prevent cross talk (e.g., the output 160 coupled to the input 155) during a switch transition, the clocks signals can be configured so that the transitions of the CLK2-$i$ and the transitions of the CKL2 do not overlap in time with each other. The relative duty cycle difference between the clocks may be adjusted to ensure that the overlap of the ON states of the switches is minimized (e.g., made zero). This adjustment may correspond to maximizing the efficiency at which energy is coupled from the input 155 to the energy storage capacitors 360. Additionally, the clock signals can be configured so that the transitions of CLK2-$i$ and CLK2 do not overlap with the transition of CLK1-I and CLK1. This configuration ensures that the output 160 remains decoupled from the input 155.

The first and second input switching devices 340, 350 are controlled by CLK2-$i$ and CLK 2 respectively to alternatively couple/decouple capacitors 360, 365 to/from the input 160. The input switching devices 345, 355 may be NMOS transistors but the described circuit may utilize other types (e.g., PMOS) and other technologies (e.g., BJT, JFET, etc.). CLK2 and CLK2-$i$ alternate between a relatively low voltage (e.g., GND) and a relatively high voltage (e.g., $V_{IN}$), and were these voltages applied directly to a gate of a first input NMOS transistor and to a gate of the second input NMOS transistor then switching would not occur because a threshold voltage of each device would never be exceeded. Accordingly, the system includes a first conditioning circuit 320 to shift the voltages of the inverse second clock relative to a voltage at the input 155, and a first conditioning circuit 320 to shift the voltages of the inverse second clock relative to the voltage at the input 155.

Figure 5:
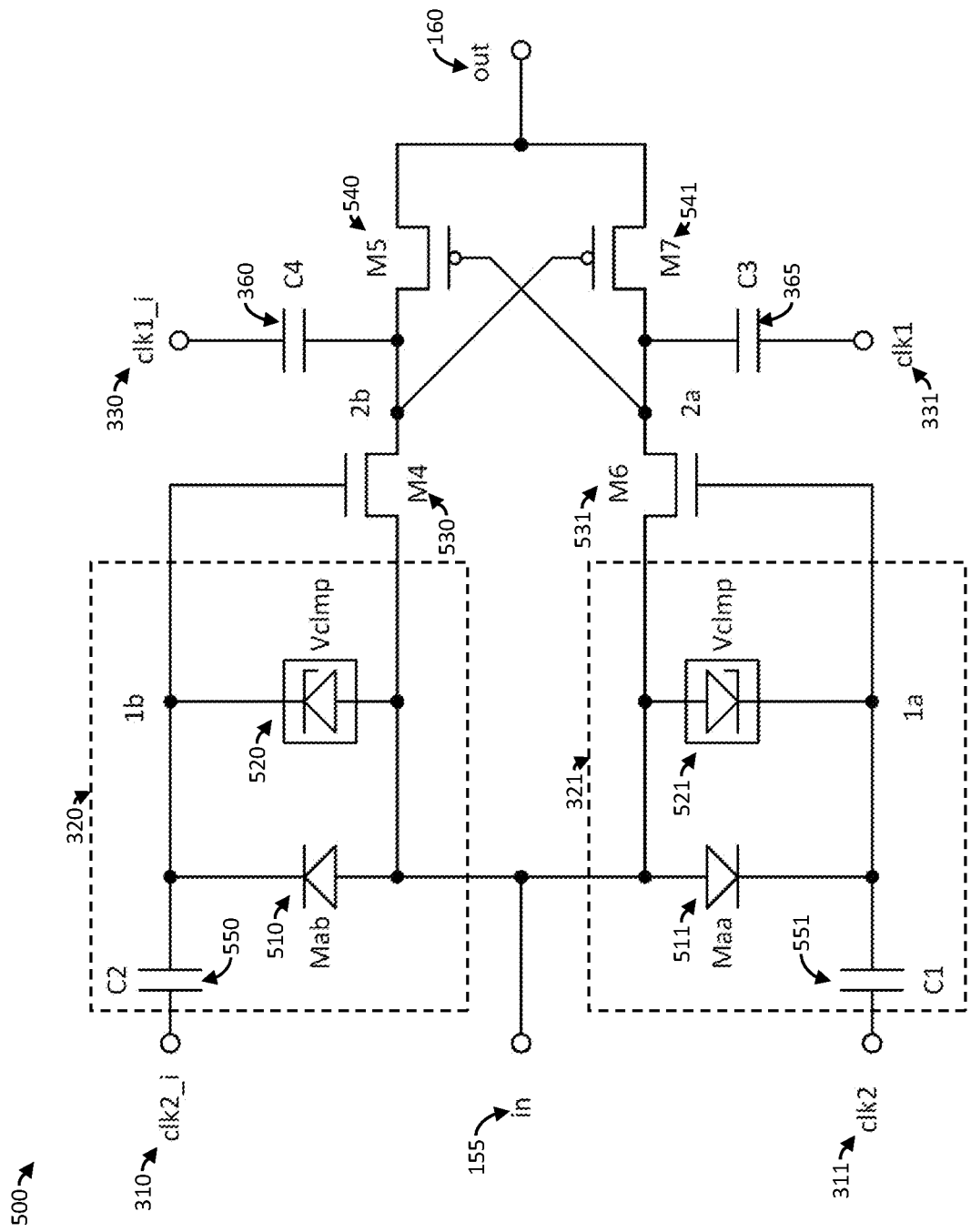
FIG. 5 is a schematic of a charge pump circuit according to a first possible embodiment of the present disclosure.

FIG. 5 is a schematic of a charge pump circuit according to a first possible embodiment of the present disclosure. The charge pump circuit 500 includes a first energy-storage capacitor (C4) 360 and a second energy storage capacitor (C3) 365. C4 360 is alternatively coupled and decoupled to an output 160 of the circuit 500 by a first output transistor (M5) 540 according to pump-out clock signal (clk1) 331. C3 365 is alternatively coupled and decoupled to an output 160 of the circuit 500 by a second output transistor (M7) 541 according to an inverse pump-out clock signal (clk1_i) 330. Both pump-out clock signals (i.e., clk1 and clk1_i) alternate between a relatively low voltage (e.g., a ground voltage) and a relatively high voltage (e.g., $V_{IN}$) at a switching frequency. The clock signals (i.e., clk1 and clk1_i) are phase shifted by about 180 degrees so that while one clock is at a relatively high voltage the other clock is at a relatively low voltage. In some embodiments, the transitions from low-to-high and/or high-to-low for the clock signals are timed so that there is no overlap in the transitions.

For the embodiment shown in FIGS. 5, M5 and M7 are PMOS output transistors that are cross-coupled, at their gate terminals, to the capacitor (i.e., C3 and C4 respectively) on the opposite side of a symmetric circuit. The source of each PMOS output transistor is coupled to the output 160 of the circuit and the drain of each PMOS output transistor is coupled to the capacitor on the same side of the symmetric circuit (i.e., C4 and C3 respectively). The capacitors on each side of the symmetric circuit (i.e., C4 and C3) are coupled to the clock for the same respective side of the symmetric circuit (i.e., clk1_i and clk1 respectively). This configuration ensures that a PMOS output transistor couples the capacitor at its drain to the output 160 when a low clock signal is applied to the capacitor at its gate, and that a PMOS output transistor decouples the capacitor at its drain to the output 160 when a high clock signal is applied to the capacitor at its gate.

The charge pump circuit 500 also includes a first input transistor (M4) 530 and a second input transistor (M6) 531. M4 530 and M6 531 function to couple/decouple C4 360 and C3 365, respectively, to/from an input 155 for charging. The switching of M4 530 and M6 531 is based on pump-in clock signals (clk2_i, clk2) that are conditioned (e.g., level-shifted in voltage) by a first conditioning circuit 320 and a second conditioning circuit 321, respectively. Accordingly, each of M4 530 and M6 531 are coupled at its gate terminal to a first conditioning circuit 320 and the second conditioning circuit 321, respectively. For the embodiment shown in FIG. 5, M4 530 and M6 531 are NMOS transistors coupled at their source terminals to the input 155 and coupled at their drain terminals to the energy storage capacitors, C4 360 and C3 365, respectively.

The first conditioning circuit receives an inverse pump-in clock signal (clk2_i) 310 and the second conditioning circuit receives a pump-in clock signal (clk2) 311. Both clock signals (i.e., clk2 and clk2_i) alternate between a relatively low voltage (e.g., a ground voltage) and a relatively high voltage (e.g., $V_{IN}$) at a switching frequency. The clock signals (i.e., clk2 and clk2_i) are phase shifted by about 180 degrees so that while one clock is at a relatively high voltage the other clock is at a relatively low voltage. In some embodiments, the transitions from low-to-high and/or high-to-low for all clock signals (clk1, clk2, clik1_i, and clk2_i) in the charge pump circuit 500 are timed so that there is no overlap in the transitions.

The first conditioning circuit 320 includes a first rectifying element Mab 510 coupled between the input 155 and a terminal of the first gate-control capacitor (C2) 550. The other terminal of the first gate-control capacitor receives the inverse pump-in clock signal (clk2_i). In a clock phase during which clk2_i 310 is at a relatively low voltage (e.g., ground voltage), C2 550 is charged through the rectifying element Mab 510 (which is forward biased) to approximately $V_{IN}$ (minus the voltage drop of the rectifying element, Mab). In this phase, M4 530 is in an OFF state and the input 155 is decoupled from C4 360. In a clock phase, during which clk2_i 310 is at a relatively high voltage (e.g., $V_{IN}$), the voltage at the gate of M4 is the clk2_i voltage (e.g., $V_{IN}$) plus the voltage of the charged capacitor C2 (e.g., $V_{IN}$ minus the drop across Mab 510) and the voltage at the source of M4 is VIN. In this condition, M4 is in an ON state and couples C4 360 to the input 155. Current is prevented from flowing from C2 to the input in this phase by the rectifying element Mab 510, which is reversed biased.

In other words, the configuration of C2 550 and Mab 510 form an auxiliary charge pump for the purpose of level shifting clk2_i 310 according to the DC voltage at the input 155 (i.e., $V_{IN}$) to drive the gate of M4 530. For the embodiment shown in FIG. 5, the rectifying element Mab 510 is a diode. For example, a Schottky diode may be used for its low forward voltage drop. The first gate control capacitor C2 550 may be smaller than the energy storage capacitor 360 because its purpose is limited to driving the gate of M4.

The first conditioning circuit 320 can (in some embodiments) also include a voltage clamp Vclmp 520. The voltage clamp prevents the transistor M4 from being placed in an over voltage condition. For example, if the input voltage is suddenly made zero while the clk2_i signal is high, then the gate-source voltage of M4 530 may exceed its rated voltage. In this condition the Vclmp 520 breaks down to drain the capacitor C2 550, thereby reducing the voltage stress on the first input transistor M4 530. For the embodiment shown in FIG. 5, the voltage clamp Vclmp 520 is a Zener diode.

The voltage clamp Vclmp 520 can be used for circuit protection. For example, Vclmp 520 may be (e.g., may only be) operational during a start, a stop, and/or a change of an input/output voltage. In some implementations, equivalent circuit protection may be achieved through circuitry that is external to the charge pump circuit 500 and/or may not be required for certain elements (e.g., M0, M1, M2, M3) based on their selected operating specifications. Accordingly, some implementations can include the Vclmp 520 being absent from the first conditioning circuit.

The second conditioning circuit 321 includes a second gate-control capacitor (C1) 551, a second rectifying element, Maa 511, and a second voltage clamp, Vclmp 521. The configuration of C1 551 and Maa 511 form a second auxiliary charge pump for the purpose of level shifting clk2 311 according to the DC voltage at the input 155 (i.e., $V_{IN}$) to drive (i.e., switch) the gate of the second input transistor, M6 531. The function, the elements, and the variations of the second conditioning circuit 321 are not further described because they correspond to and can be described similarly as the first conditioning circuit 320.

Figure 6:
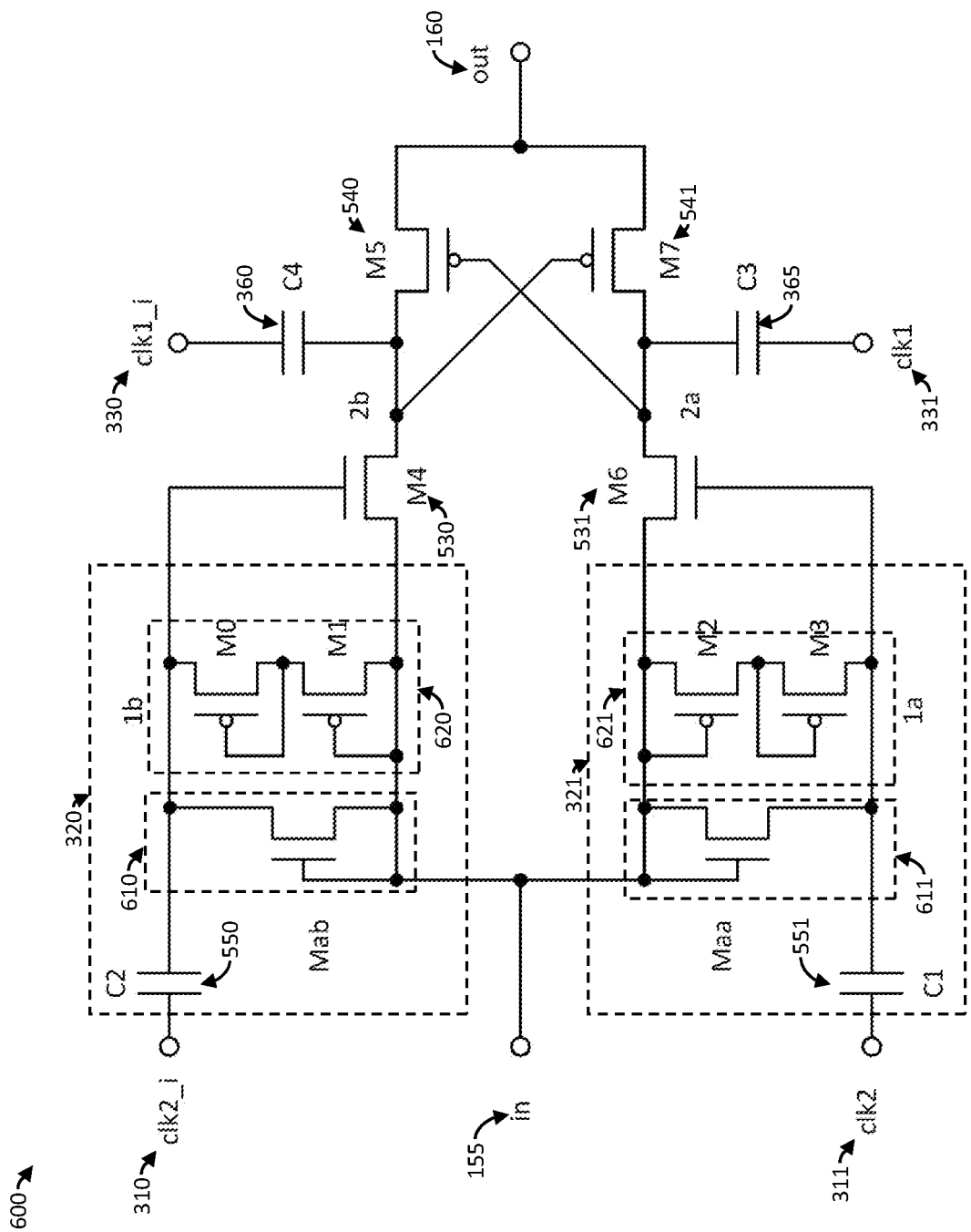
FIG. 6 is a schematic of a charge pump circuit according to a second possible embodiment of the present disclosure.

FIG. 6 is a schematic of a charge pump circuit 600 according to a second possible embodiment of the present disclosure. The embodiment is similar to the embodiment shown in FIG. 5 except for the rectifying elements 610, 611 and the voltage clamp elements 620, 621.

For the embodiment in FIG. 6, the rectifying elements Mab 610 and Maa 611 are diode connected (e.g., gate-drain coupled NMOS transistor) MOSFET transistors. The diode-connected transistors function similarly to the diodes, Mab 510 and Maa 511, shown in FIG. 5, but may have a lower forward voltage. In some embodiments, a body terminal on the MOSFET transistors of Mab and Maa can be coupled to a low voltage relative to an input voltage (e.g., a ground voltage) to create a body effect that suppresses backwards current through the rectifying element. The suppressed backwards current increases the overall efficiency of the charge pump circuit. When multiple charge pumps are coupled in series (e.g., FIG. 8), the body terminals of Mab and Maa for each stage may be coupled to a low voltage relative to an input voltage for each stage.

For the embodiment of the charge pump circuit 600 that is shown in FIG. 6, the first voltage clamp 620 includes two diode-connected transistors (e.g., PMOS transistors) (M0, M1) that are connected in series between the first gate-control capacitor (C2) 550 and the input 155. M0 and M1 serve to discharge the capacitor C2 (e.g., in a phase after being charged), and can protect M4 from an overvoltage, especially during a startup or shutdown condition. For example, in a startup or shutdown condition, M0 and M1 may prevent the input voltage and the voltage across C2 from creating a voltage that exceeds the operating requirements for the input transistor. Likewise, the charge pump circuit 600 includes a second voltage clamp 621 that includes two diode-connected transistors (e.g., PMOS transistors) (M2, M3) that are connected in series between the second gate-control capacitor (C1) 551 and the input 155. M2 and M3 can function to protect M6 by discharging the capacitor C1 in at startup or shutdown condition.

Figure 7:
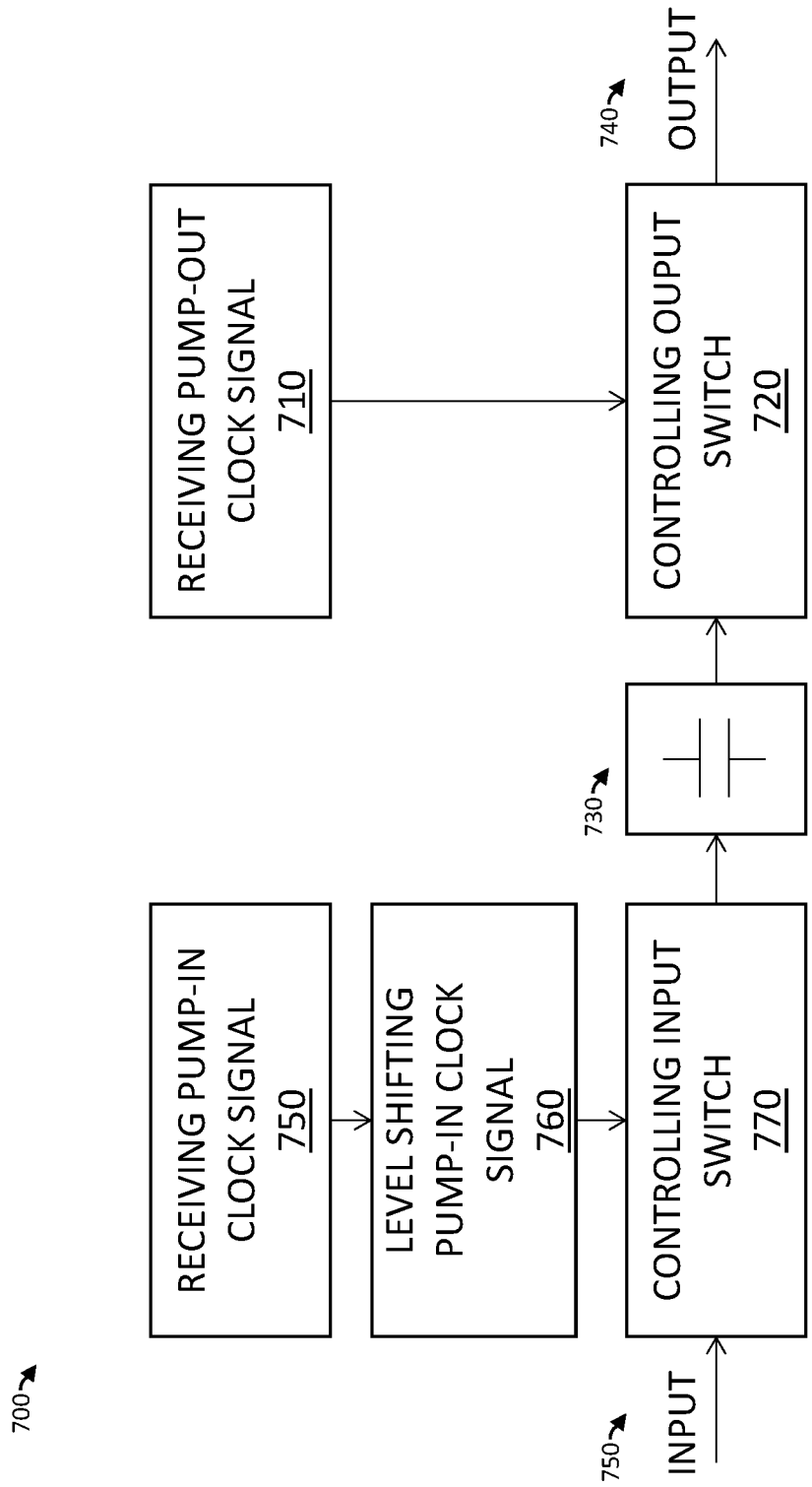
FIG. 7 is a flow chart of a method for controlling the switching in a DC-DC converter circuit.

FIG. 7 is a flow chart of a method 700 for controlling the switching in a DC-DC converter circuit. The method 700 includes receiving 710 a pump-out clock signal controlling 720 an output switch according to the pump-out clock to couple an energy storage capacitor 730 to an output 740. The method also includes receiving 750 a pump-in clock signal. The pump-in clock signal may be a phase shifted (e.g., 180 degrees) version of the pump-out clock signal with transitions that are adjusted to prevent overlapping in time with the pump-out clock signal. The pump-in clock signal is then level shifted 760 (e.g., by an auxiliary charge pump circuit) to voltages relative to an input 750. The method includes controlling an input switch to couple the energy storage capacitor 730 to the input 750 based on the level-shifted pump-in clock signal.

Figure 8:
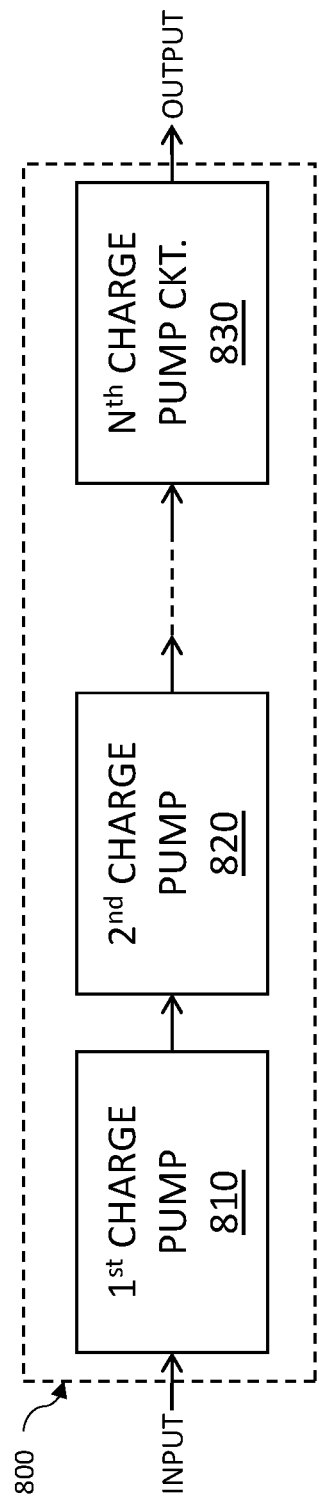
FIG. 8 is a system for converting a DC voltage according to an embodiment of the present disclosure.

FIG. 8 is a system 800 for converting a DC voltage according to an embodiment of the present disclosure. The system includes a plurality of charge pump circuits, such as those illustrated in FIG. 3. The charge pump circuits are connected (i.e., daisy chained) so that the output of the first charge pump circuit 810 is connected to the input of the $2^{nd}$ charge pump circuit 820, and so on until the an $n^{th}$ (i.e., final) charge pump circuit, which provides the output of the system 800. The charge pump circuits 810, 820, 830 may be identical to, or based on, the embodiments shown (see FIG. 5 or 6) so that the output is increased after at each charge pump circuit stage to provide an overall output that is higher than may be obtained by a single charge pump circuit (e.g., $V_{OUT}=V_{IN}+N_{STAGES} \cdot V_{IN}$).

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation and scientific terms used herein can have the same meaning as commonly understood by one of ordinary skill in the art.

It will be understood that, in the foregoing description, when an element, such as a component is referred to as connected to, electrically connected to, coupled to, or electrically coupled to another element, it may be directly connected or coupled to the other element, or one or more intervening elements may be present. In contrast, when an element is referred to as directly connected to or directly coupled to another element, there are no intervening elements or layers present. Although the terms directly connected to or directly coupled to may not be used throughout the detailed description, elements that are shown as being directly connected or directly coupled can be referred to as such. The claims of the application, if any, may be amended to recite exemplary relationships described in the specification or shown in the figures.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A charge pump circuit comprising:
 a first energy-storage capacitor and a second energy-storage capacitor;
 a first output transistor controlled by a pump-out clock to couple and decouple the first energy-storage capacitor to an output of the charge pump circuit;
 a second output transistor controlled by an inverse-pump-out clock to couple and decouple the second output transistor to the output of the charge pump circuit;
 a first input transistor configured to couple and decouple the first energy-storage capacitor to an input of the charge pump circuit;
 a second input transistor configured to couple and decouple the second energy-storage capacitor to the input of the charge pump circuit; and
 a first conditioning circuit coupled between a pump-in clock and a gate of the first input transistor that level shifts the pump-in clock to a voltage relative to an input voltage of the charge pump circuit to configure the first input transistor, the first conditioning circuit including a first rectifying element and a first gate-control capacitor, the first gate-control capacitor is coupled to the gate of the first input transistor; and
 a second conditioning circuit coupled between an inverse-pump-in clock and a gate of the second input transistor that level shifts the inverse-pump-in clock to a voltage relative to the input voltage of the charge pump circuit to configure the second input transistor the second conditioning circuit including a second rectifying element and a second gate-control capacitor, the second gate-control capacitor is coupled to the gate of the first input transistor.

2. The charge pump circuit according to claim 1, wherein the first rectifying element and the second rectifying element are each a diode-connected metal oxide semiconductor transistor (MOSFET).

3. The charge pump circuit according to claim 2, wherein each diode-connect MOSFET includes a body terminal that is coupled to a low voltage relative to the input of the charge pump circuit.

4. The charge pump circuit according to claim 1, wherein the first rectifying element and the second rectifying element are each a diode.

5. The charge pump circuit according to claim 1, wherein:
the first conditioning circuit further includes a first voltage clamp that is connected between the gate of the first input transistor and the input voltage to prevent an over voltage condition in the first input transistor, and
the second conditioning circuit further includes a second voltage clamp that is connected between the gate of the second input transistor and the input voltage to prevent the over voltage condition in the second input transistor.

6. The charge pump circuit according to claim 5, wherein the first voltage clamp and the second voltage clamp each include at least one rectifying element.

7. The charge pump circuit according to claim 1, wherein switch transitions of at least two of the first output transistor, the second output transistor, the first input transistor, and the second input transistor do not overlap in time.

8. The charge pump circuit according to claim 1, wherein transitions of at least two of the pump-in clock, the inverse-pump-in clock, the pump-out clock, and the inverse-pump-out clock are adjustable in time relative to one another.

9. The charge pump circuit according to claim 8, wherein the clock transitions are adjusted to decrease cross talk between a first portion and a second portion of the charge pump circuit during each phase of the clocks.

10. The charge pump circuit according to claim 9, wherein the decrease of cross talk between the first portion and the second portion of the charge pump circuit corresponds to an increase in efficiency of the charge pump circuit.

11. The charge pump according to claim 1, wherein the level shift of the pump-in clock to voltages relative to the input voltage of the charge pump circuit and the level shift of the inverse-pump-in clock to voltages relative to the input voltage of the charge pump circuit accommodates a range of input voltages at the input of charge pump circuit.

12. A system for converting a DC voltage, the system comprising:
a charge pump circuit including two symmetric portions, each symmetric portion including:
an energy storage capacitor coupled between an input switch and an output switch, the input switch and the output switch being individually controlled by different clock signals to alternatively couple the energy storage capacitor to an input and to an output, and the clock signal controlling the input switch being level shifted by a conditioning circuit to voltages relative to the DC voltage at the input, the conditioning circuit including a gate-control capacitor coupled between a pump-in clock and a gate terminal of the input switch and a rectifying element coupled between the input of the system and the gate-control capacitor.

13. The system for converting a DC voltage according to claim 12, wherein the input switch is an n-type metal oxide semiconductor (NMOS) transistor and the output switch is a p-type metal oxide semiconductor (PMOS) transistor.

14. The system for converting a DC voltage according to claim 12, wherein the gate-control capacitor and the rectifying element of the conditioning circuit collectively function as an auxiliary charge pump to level shift the clock signal from the pump-in clock according to the DC voltage at the input.

15. The system for converting a DC voltage according to claim 12, wherein the conditioning circuit includes:
a voltage clamp coupled between the gate-control capacitor and the input of the system to protect a gate terminal of the input switch from an over voltage condition.

16. The system for converting a DC voltage according to claim 12, wherein the charge pump circuit is a first charge pump circuit and the system further comprises:
a second charge pump circuit connected in series with the first charge pump circuit to convert the DC voltage at the input of the first charge pump circuit to a higher voltage.

17. A method for controlling switching in a DC-DC converter, comprising:
receiving a pump-out clock signal;
controlling an output switch to couple an energy storage capacitor to an output according to the pump-out clock signal;
receiving a pump-in clock signal from a pump-in clock;
level shifting the pump-in clock signal to voltages relative to an input voltage at an input of the DC-DC converter using a conditioning circuit that includes a gate-control capacitor coupled between the pump-in clock and a gate terminal of an input switch and a rectifying element coupled between the input of the DC-DC converter and the gate-control capacitor; and
controlling the input switch to couple the energy storage capacitor to the input according to the level-shifted pump-in clock signal.

18. The method for controlling switching in a DC-DC converter according to claim 17, wherein switch transitions of the output switch and the input switch do not overlap in time.

* * * * *